F. J. BOHN.
SAFETY DEVICE.
APPLICATION FILED MAR. 28, 1921.

1,396,017.

Patented Nov. 8, 1921.

Inventor
FRANK J. BOHN
By
Attorney

UNITED STATES PATENT OFFICE.

FRANK J. BOHN, OF BALTIMORE, MARYLAND.

SAFETY DEVICE.

1,396,017.

Specification of Letters Patent.

Patented Nov. 8, 1921.

Application filed March 28, 1921. Serial No. 456,149.

*To all whom it may concern:*

Be it known that I, FRANK J. BOHN, a citizen of the United States, residing at Baltimore, in the State of Maryland, have invented certain new and useful Improvements in Safety Devices, of which the following is a specification.

This invention relates to safety devices for trolley cars, and it comprises a guard or railing adapted to be arranged around the fare box on the platform of the car, and secured to the base which supports the fare box and forms the guide for the door operating lever. In the types of trolley cars now in general use, the conductor is stationed inside of the car adjacent the edge of the platform. The car is provided with doors which are closed when running, and which are operated by suitable levers extending from the side of the car to the center and connected to an operating lever arranged adjacent the platform and positioned within a vertical post. Since the introduction of the use of fare boxes in which the passenger is supposed to place his fare as he enters the car, suitable supporting brackets have been attached to this vertical guide post and the fare box secured thereto. When the passenger enters the car, and the car starts, there is a tendency to throw the passenger rearwardly off his balance if he does not support himself in some manner. In the body of the car, it is customary to provide handgrips on the seats and straps above the heads of the passengers, but on the platform, there is nothing to grasp except the fare box and the guide post for the operating lever. As the fare box is generally provided with a reduced upper portion forming an irregular surface, it is difficult to grasp, and the guide post is generally out of reach of the passenger, due to the position of the fare box.

In the present invention, I provide a handgrip or supporting device comprising a substantially semi-circular guard or railing adapted to extend around the fare box and arranged at any suitable height. The two ends of the railing are provided with offset portions connected thereto by means of elbows or other suitable fittings, and these offset portions carry sleeves which are adapted to surround rods forming a part of the bracket supporting the fare box. The sleeves and the offset ends are made in two sections, split longitudinally, to permit them to be opened to engage the rods. The hinged portion of the offset arm is provided with threads and a nut is provided which is adapted to lock the sleeve in position on the rod.

Figure 1:
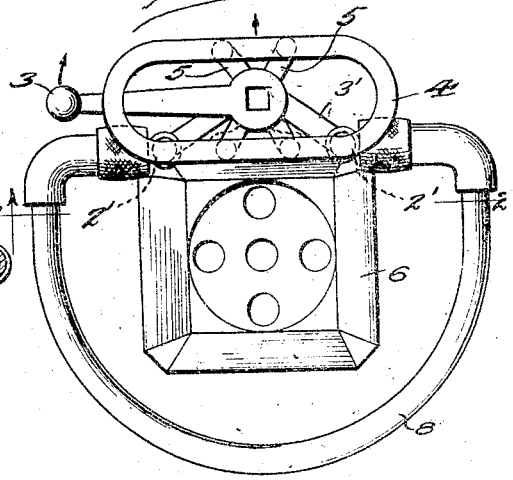
Figure 2:
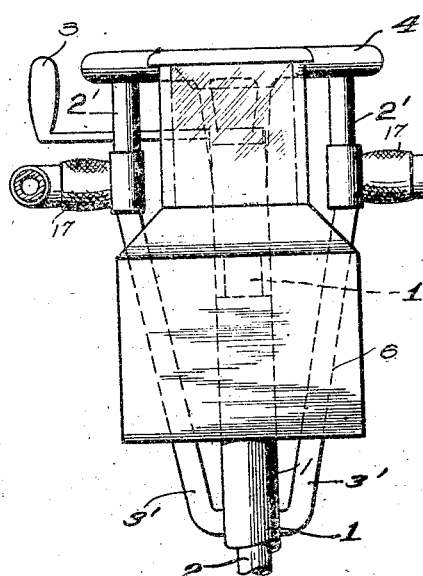
Figure 4:
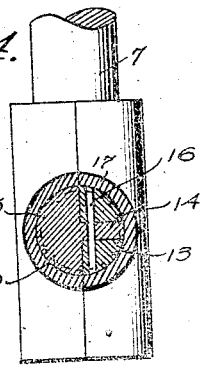
Figure 3:
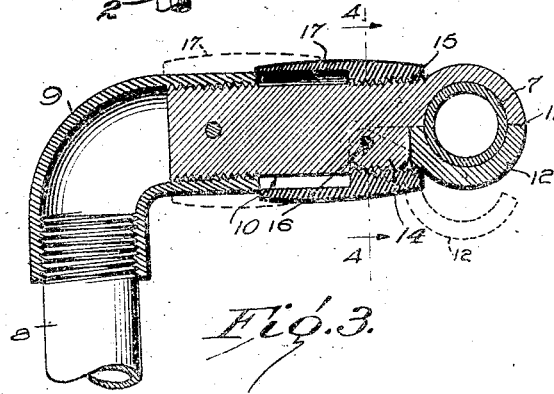

In the accompanying drawings, I have shown several embodiments of the invention. In this showing, Figure 1 is a plan view of a portion of the guide rod and fare box, showing the invention applied, Fig. 2 is a vertical sectional view on line 2—2 of Fig. 1, Fig. 3 is a central horizontal sectional view through one end of the attachment, Fig. 4 is a vertical sectional view on line 4—4 of Fig. 3, and, Fig. 5 is a perspective view of another form of the invention.

Referring to the drawings, the reference numeral 1 designates generally the guide rod or sleeve arranged at the rear of the car adjacent the platform and centrally with respect to the sides of the car. An operating shaft 2 extends through this guide rod, the operating shaft and the guide rod terminating at a suitable height for the convenience of the operator or conductor in the usual manner. A handle 3 is detachably arranged on the top of the operating shaft to permit operation of the doors. The upper end of the guide rod is surrounded by a substantially oval shaped guide ring 4 forming a guide for the operator in opening and closing the door. The guide ring is secured to the guide rod or sleeve by means of arms 5 which are attached to the guide ring and the guide sleeve respectively, in any suitable manner, or made integral therewith. A fare box 6 is supported on the guide rod, the fare box being provided with a recess in one face, adapted to receive a lug or projection 1' arranged on the guide rod. A pair of arms 2' are secured to the guide ring, the arms extending downwardly in a vertical plane for a short distance and then being inclined inwardly, as at 3', and secured to the guide rod. The attachment forming the subject matter of the present invention comprises a substantially semi-circular guard or railing 8, arranged to surround the fare box (see Fig. 2), and disposed at any suitable elevation. The ends of the railing are provided with elbows 9 or other suitable fittings, whereby the offset arms 10 are secured thereto. In the form of the invention shown in Figs. 1 to 4 of the drawings, these offset arms are arranged in a horizontal plane. A sleeve 11 is arranged on the end of the offset arm and is adapted to surround the rod 2' to secure the guard in position. As shown, the sleeve is provided with a hinged section 12, carrying a substantially semi-cylindrical extension 13, forming a part of the offset arm. This extension is provided with a recess for the reception of a lug 14, projecting from the semi-cylindrical portion 15, which carries the movable half of the sleeve. A rod or pin 16 is passed through the extension 13, and the lug 14, whereby the section 12 of the sleeve is hinged and is adapted to be opened to the dotted line position shown in Fig. 3 of the drawings for attachment to the rod 2'. The semi-cylindrical portions 13 and 15 of the offset arm are provided with threads for the reception of a threaded locking sleeve 17. It will be apparent that when the sleeve is in the position shown in the drawings, the movable section 12 of the sleeve will be maintained in closed position around the rod 2'. Suitable fastening means may be employed, if desired, to prevent vertical displacement of the sleeves 11.

Attention is called to the fact that the threaded portion of the offset arm is tapered inwardly which provides a greater clearance for the hinged section of the sleeve when in open position, and also enables the locking ring 17 to be tightly clamped thereon.

Figure 5:
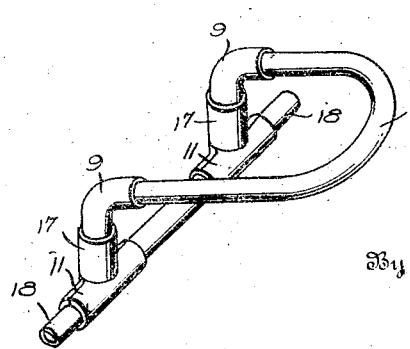

In the form of the invention shown in Fig. 5 of the drawings, the construction of the guard or railing is the same, but the elbows 9 are turned a quarter revolution to arrange the offset ends in a vertical plane. The device is arranged in such position where the sleeves 11 are adapted to engage a horizontal rod 18.

It will be apparent that the attachment forms a handgrip or railing which may be grasped by a passenger when boarding the car to prevent the passenger from being thrown off his balance when the car first starts. The device may be readily attached and detached, permitting its use on a car which is reversed at the end of the route and the conductor or fare collector stationed at the opposite end of the car. To remove the attachment, it is merely necessary to move the locking nut 17 to the position shown in dotted lines in Fig. 3 of the drawings, and release the hinged section 12 of the sleeve. The device may then be carried to the other end of the car as the fare box is carried and attached.

It is to be understood that the forms of the invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. An attachment for trolley cars comprising a substantially semi-circular guard or railing, the ends of said railing being offset, and sleeves carried by each of said offset ends whereby said guard or railing may be secured to a support.

2. An attachment for trolley cars comprising a substantially semi-circular guard or railing, the ends of said railing being offset, a split sleeve carried by each of said offset ends, and means for securing said sleeve to a support.

3. An attachment for trolley cars comprising a substantially semi-circular guard or railing, the ends of said railing being offset, said offset ends being split longitudinally, the split portions being hinged to each other, a sleeve comprising a pair of sections, one of which is secured to each section of said split ends, said split ends being provided with threads, and a locking nut mounted on said offset portions adapted to engage said threads to maintain said sleeves in closed position.

4. An attachment for street cars comprising a substantially semi-circular guard or railing, the ends of said railing being offset, the ends of each of said offset portions being cut away to form a substantially semi-cylindrical portion, a lug carried by said semi-cylindrical portion, a hinged section mounted adjacent said cut away portion adapted to coöperate therewith to form a substantially cylindrical end, said end being tapered and provided with external threads, said hinged section being hingedly mounted on said lug, a sleeve comprising a pair of sections secured to the end of said offset arm and to said hinged section, and a threaded sleeve arranged on said offset portion to maintain the sleeve in closed position.

5. A detachable guard or railing for trolley cars to be secured to a support circular in cross-section and forming a normal part of a trolley car, said guard comprising a semi-circular body portion, said body portion being provided with off-set ends and fastening members carried by said off-set ends adapted to embrace said support.

In testimony whereof I affix my signature.

FRANK J. BOHN.